(12) United States Patent
Liu

(10) Patent No.: US 10,938,978 B2
(45) Date of Patent: Mar. 2, 2021

(54) CALL CONTROL METHOD AND APPARATUS

(71) Applicant: HUAWEI TECHNOLOGIES CO., LTD., Shenzhen (CN)

(72) Inventor: Jie Liu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/495,434

(22) PCT Filed: Apr. 21, 2017

(86) PCT No.: PCT/CN2017/081501
§ 371 (c)(1),
(2) Date: Sep. 19, 2019

(87) PCT Pub. No.: WO2018/170992
PCT Pub. Date: Sep. 27, 2018

(65) Prior Publication Data
US 2020/0068064 A1    Feb. 27, 2020

(30) Foreign Application Priority Data

Mar. 21, 2017    (CN) .......................... 201710171132.4

(51) Int. Cl.
*H04M 1/663*     (2006.01)
*H04M 1/725*    (2006.01)
(Continued)

(52) U.S. Cl.
CPC ........ *H04M 1/72569* (2013.01); *G06F 3/165* (2013.01); *H04M 1/656* (2013.01);
(Continued)

(58) Field of Classification Search
None
See application file for complete search history.

(56) References Cited

U.S. PATENT DOCUMENTS 7,113,572 B2 *    9/2006    Holmes ................. H04M 1/652
                                                        379/88.14
8,145,274 B2 *    3/2012    Gandhi ............ H04M 1/72522
                                                        455/456.1
(Continued)

FOREIGN PATENT DOCUMENTS

CN    102572839 A    7/2012
CN    103325031 A    9/2013
(Continued)

*Primary Examiner* — Tuan A Tran
(74) *Attorney, Agent, or Firm* — Rimon PC

(57) ABSTRACT

Embodiments of the present invention provide a call control method and an apparatus that implement, in a terminal that is in call state, an operation function that corresponds to the call content. The operation function is designed to prevent a user from missing the call content when the user is engaged in a different task. The method includes the following steps: during a call between two terminals: detecting, by one of the terminals, the content of the call between the two terminals; and when the call content matches preset target information, performing by this terminal, an operation that corresponds to the detected call content.

16 Claims, 21 Drawing Sheets

---

A first terminal detects first call content during a call with a second terminal — 501

When the first call content includes preset target information, the first terminal obtains a recording operation instruction corresponding to the target information — 502

In a state in which the first terminal maintains the call with the second terminal, the first terminal performs a recording operation on second call content that includes the first call content based on the recording operation instruction — 503

(51) Int. Cl.
*G06F 3/16* (2006.01)
*H04M 1/656* (2006.01)
*G06F 3/0484* (2013.01)

(52) U.S. Cl.
CPC ..... *H04M 1/72566* (2013.01); *G06F 3/04847* (2013.01); *H04M 2201/40* (2013.01)

(56) References Cited

U.S. PATENT DOCUMENTS

| | | | | |
|---|---|---|---|---|
| 8,503,987 | B2* | 8/2013 | Rangroo | H04M 3/562 455/412.1 |
| 8,706,827 | B1* | 4/2014 | Noble | G10L 13/027 709/206 |
| 8,768,308 | B2* | 7/2014 | Kim | G06Q 10/109 379/88.08 |
| 8,855,289 | B2* | 10/2014 | Kaplan | H04M 3/42195 379/210.01 |
| 8,965,344 | B2* | 2/2015 | Rangroo | H04M 3/562 455/412.1 |
| 9,338,288 | B2* | 5/2016 | Mikan | H04M 3/42221 |
| 9,363,104 | B2* | 6/2016 | Noble | H04M 1/64 |
| 9,471,212 | B2* | 10/2016 | Chiu | H04L 51/02 |
| 9,473,618 | B2* | 10/2016 | Woloshyn | H04L 67/36 |
| 9,544,428 | B2* | 1/2017 | Mikan | H04M 3/42221 |
| 9,747,894 | B2* | 8/2017 | Hsu | G10L 15/08 |
| 2010/0080382 | A1* | 4/2010 | Dresher | H04M 1/6033 379/421 |
| 2011/0034156 | A1* | 2/2011 | Gatti | H04M 1/56 455/415 |
| 2011/0093266 | A1* | 4/2011 | Tham | G10L 17/04 704/246 |
| 2011/0244832 | A1* | 10/2011 | Silva | H04M 1/656 455/412.1 |
| 2013/0204622 | A1 | 8/2013 | Lu et al. | |
| 2015/0161989 | A1* | 6/2015 | Hsu | G10L 15/08 704/251 |
| 2015/0163610 | A1* | 6/2015 | Sampat | H04R 29/00 381/58 |
| 2016/0080552 | A1* | 3/2016 | Keating | G06F 1/1686 455/550.1 |
| 2016/0148615 | A1 | 5/2016 | Lee et al. | |
| 2017/0257400 | A1* | 9/2017 | Peters | H04L 65/1083 |

FOREIGN PATENT DOCUMENTS

| | | |
|---|---|---|
| CN | 103369136 A | 10/2013 |
| CN | 103391359 A | 11/2013 |
| CN | 103442119 A | 12/2013 |
| CN | 103929551 A | 7/2014 |
| CN | 104038630 A | 9/2014 |
| CN | 104123937 A | 10/2014 |
| CN | 104335559 A | 2/2015 |
| CN | 104754100 A | 7/2015 |
| CN | 104766608 A | 7/2015 |
| CN | 104796536 A | 7/2015 |
| CN | 105306751 A | 2/2016 |
| CN | 105323366 A | 2/2016 |
| CN | 105635402 A | 6/2016 |
| CN | 105847520 A | 8/2016 |
| CN | 106210342 A | 12/2016 |
| EP | 3110116 B1 | 9/2019 |

* cited by examiner

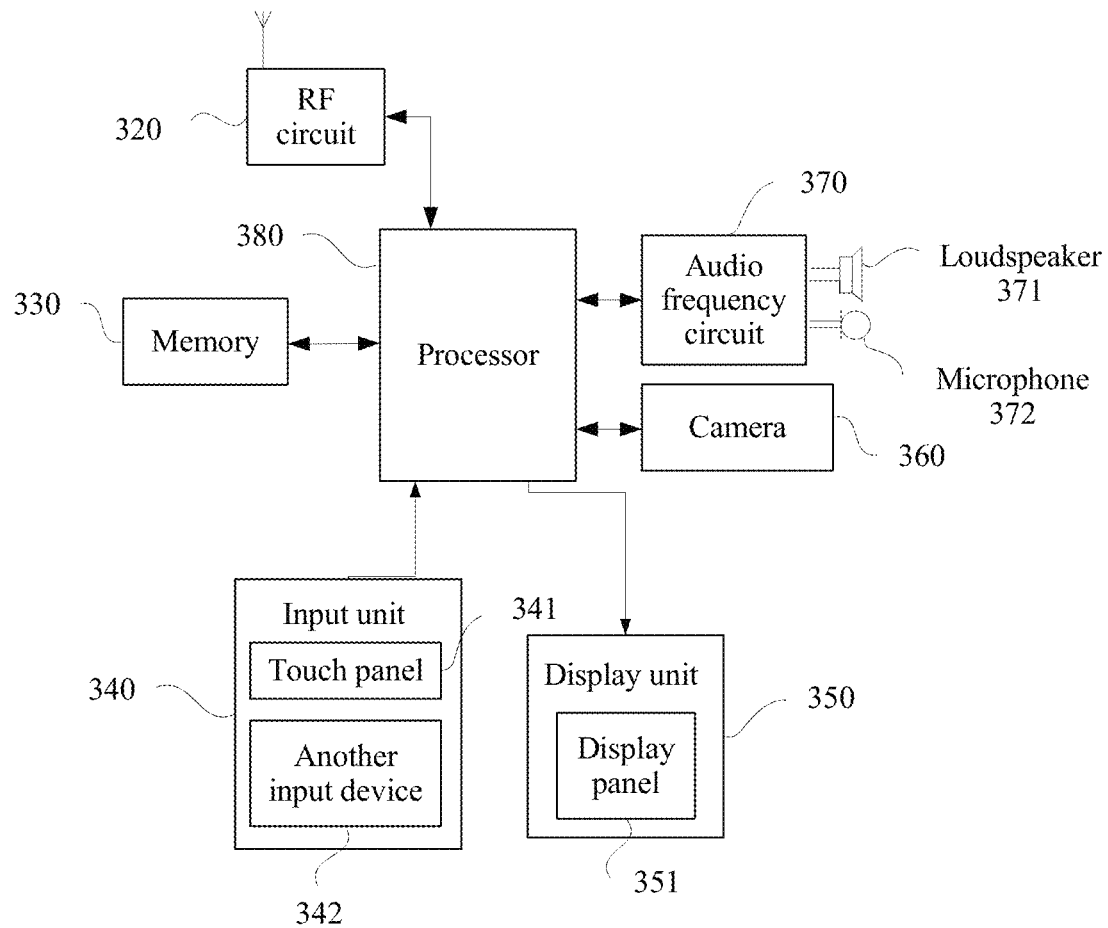

FIG. 4

- A first terminal detects first call content during a call with a second terminal — 501
- When the first call content includes preset target information, the first terminal obtains a recording operation instruction corresponding to the target information — 502
- In a state in which the first terminal maintains the call with the second terminal, the first terminal performs a recording operation on second call content that includes the first call content based on the recording operation instruction — 503

FIG. 5

CALL CONTROL METHOD AND APPARATUS

CROSS-REFERENCE TO RELATED APPLICATIONS

This application is a national stage of International Application No. PCT/CN2017/081501, filed on Apr. 21, 2017, which claims priority to Chinese Patent Application No. 201710171132.4, filed on Mar. 21, 2017. Both of the aforementioned applications are hereby incorporated by reference in their entireties.

TECHNICAL FIELD

Embodiments of the present invention relate to the field of communications technologies, and in particular, to a call control method and an apparatus.

BACKGROUND

Currently, many terminals (for example, a mobile phone and a wearable device) have call functions. Using the mobile phone as an example, a user may further need to perform another operation during a call. For example, when the user needs to record time and a location during the call, a memo needs to be started while maintaining the call with the other party.

In this case, the user usually needs to exit a call screen, so as to synchronously perform the another operation during a process of maintaining the call. However, an ongoing call process may be interfered with when the user switches between task scenarios. For example, when triggering the memo during the call, the user generally first keeps away from an earpiece of a mobile phone or inserts a headset to access the call, and then exits a current call screen to enter an application interface of the memo. However, during this period, the user may miss some important information that other party said during the call, thereby reducing user experience.

SUMMARY

Embodiments of the present invention provide a call control method and an apparatus, so as to automatically implement, in a call state, an operation function corresponding to call content, and prevent a user from missing the call content in a multitasking scenario.

The following technical solutions are used in the embodiments of the present invention to achieve the foregoing objective.

According to a first aspect, an embodiment of the present invention provides a call control method. The method includes: during a call between a first terminal and a second terminal: detecting, by the first terminal content of the call between the first terminal and the second terminal; and when the call content matches preset target information, automatically performing, by the first terminal, a mute operation, so that a user can automatically enter a mute scenario in a call state without entering an interface of the mute operation.

In a possible design method, the automatically performing, by the first terminal, a mute operation includes: automatically performing, by the first terminal, a mute operation on the first terminal; or automatically performing, by the first terminal, a mute operation on the second terminal; or automatically performing, by the first terminal, mute operations on both the first terminal and the second terminal.

According to a second aspect, an embodiment of the present invention provides a call control method. The method includes: detecting, by a first terminal, content of a call with a second terminal during the call; when the call content matches preset call-back information, automatically creating, by the first terminal, a reminder event, where the reminder event includes a reminder time preset by the first terminal; when detecting that a call between the first terminal and the second terminal ends, starting to calculate, by the first terminal, the foregoing reminder time; and when the reminder time expires, outputting, by the first terminal, the reminder event, so that a user can automatically obtain a reminder event corresponding to the call content after the call ends without manually creating the reminder event.

In a possible design method, the automatically creating, by the first terminal, a reminder event includes: determining, by the first terminal, a call end time at which the call with the second terminal ends; determining, by the first terminal, a reminder time later than the call end time; and creating, by the first terminal, a reminder event based on the reminder time, where the reminder event includes at least one of an alarm, a memo event, and a calendar event.

In a possible design method, the outputting, by the first terminal, the reminder event includes: outputting, by the first terminal, the reminder event on the first terminal to remind a user that uses the first terminal to reply to the second terminal; or sending, by the first terminal, the reminder event to the second terminal to remind a user that uses the second terminal to reply to the first terminal. That is, when the user of the first terminal needs to reply to the user of the second terminal, the first terminal may output the foregoing reminder event to the user of the first terminal, or may remind, based on a reminder event sent by the second terminal, the first terminal to reply to the second terminal.

According to a third aspect, an embodiment of the present invention provides a call control method. The method includes: during a call between a first terminal and a second terminal, detecting, by the first terminal, content of the call between the first terminal and the second terminal; and when the foregoing call content matches preset target information, automatically recording, by the first terminal, at least a part of the call content for a preset period, so that a user can automatically enter a recording scenario in a call state without entering an interface operation of a recording application, and select a specific part of the call content for recording.

In a possible design method, the automatically recording, by the first terminal, at least a part of the call content for a preset period includes: recording, by the first terminal, call content of the second terminal; or recording, by the first terminal, call content of the first terminal; or recording, by the first terminal, call content of the first terminal and the second terminal.

In a possible design method, the detecting, by the first terminal, that content of a call between the first terminal and the second terminal matches preset target information includes: determining, by the first terminal, whether the foregoing call content includes voice information that matches the target information; and when the call content includes the voice information that matches the target information, determining, by the first terminal, that the detected call content matches the preset target information.

In a possible design method, the detecting, by the first terminal, that content of a call between the first terminal and the second terminal matches preset target information includes: performing, by the first terminal, semantic analysis on the content of the call between the first terminal and the second terminal, to obtain a result of the semantic analysis; and when the result of the semantic analysis indicates that the call content needs to be recorded, determining, by the first terminal, that the detected call content matches the preset target information.

According to a fourth aspect, an embodiment of the present invention provides a terminal. The terminal includes: a communications unit, a detection unit, and an execution unit. During a call between a first terminal and a second terminal, the communications unit is configured to establish the call between the first terminal and the second terminal; the detection unit is configured to detect content of the call between the first terminal and the second terminal; and the execution unit is configured to: when the call content matches preset target information, automatically perform a mute operation.

In a possible design method, the execution unit is specifically configured to: automatically perform a mute operation on the first terminal; or automatically perform a mute operation on the second terminal; or automatically perform mute operations on both the first terminal and the second terminal.

According to a fifth aspect, an embodiment of the present invention provides a terminal. The terminal includes: a communications unit, a detection unit, an execution unit, and an output unit. The detection unit is configured to detect content of a call with the second terminal during the call. The execution unit is configured to: when the call content matches preset call-back information, automatically create a reminder event, where the reminder event includes a reminder time preset by a terminal; and when detecting that the call between the first terminal and the second terminal ends, start to calculate the foregoing reminder time. The output unit is configured to: when the reminder time expires, output the reminder event.

In a possible design method, the execution unit is specifically configured to: determine a call end time at which the call with the second terminal ends; determine a reminder time that is later than the call end time; and create a reminder event based on the reminder time, where the reminder event includes at least one of an alarm, a memo event, and a calendar event.

In a possible design method, the output unit is specifically configured to: output the reminder event on the first terminal to remind a user that uses the first terminal to reply to the second terminal; or send the reminder event to the second terminal to remind a user that uses the second terminal to reply to the first terminal.

According to a sixth aspect, an embodiment of the present invention provides a terminal. The terminal includes: a communications unit, a detection unit, and an execution unit. During a call between a first terminal and a second terminal, the detection unit is configured to detect content of the call between the first terminal and the second terminal; and the execution unit is configured to: when the call content to match preset target information, automatically record at least a part of the call content for a preset period.

In a possible design method, the execution unit is specifically configured to: automatically record call content of the second terminal; or automatically record call content of the first terminal; or automatically record call content of the first terminal and the second terminal.

In a possible design method, the detection unit is specifically configured to: determine whether the content of the call between the first terminal and the second terminal includes voice information that matches the target information; and when the call content includes the voice information that matches the target information, determine that the detected call content matches the preset target information.

In a possible design method, the detection unit is specifically configured to: perform semantic analysis on the content of the call between the first terminal and the second terminal, to obtain a result of the semantic analysis; and when the result of the semantic analysis indicates that the call content needs to be recorded, determine that the detected call content matches the preset target information.

According to a seventh aspect, an embodiment of the present invention provides a terminal. The terminal is configured to perform any one of the foregoing call control methods or any combination of the foregoing call control methods.

According to an eighth aspect, an embodiment of the present invention provides a computer-readable storage medium. The computer-readable storage medium stores an instruction; and when the instruction runs on any one of the foregoing terminals, the terminal performs any one of the foregoing call control methods.

According to a ninth aspect, an embodiment of the present invention provides a computer program product that includes an instruction, and when the computer program product runs on any one of the foregoing terminals, the terminal performs any one of the foregoing call control methods.

In the embodiments of the present invention, names of the foregoing first terminal and the foregoing second terminal do not constitute a limitation on the devices themselves. In actual implementation, these devices may have another name. Provided that functions of devices are similar to functions in the embodiments of the present invention, the devices fall within the scope of the claims of the present invention and their equivalent technologies.

In addition, for technical effects brought by any design manner of the fourth aspect to the ninth aspect, reference may be made to technical effects brought by different design methods of the foregoing first aspect to the third aspect. Details are not described herein again.

Therefore, by using the call control methods provided in the embodiments of the present invention, if the detected call content meets a preset condition, a specified function is automatically performed, so that the user can focus on the call itself without performing another operation such as switching between task scenarios, and the ongoing call process will not be interfered with. This is particularly convenient when the user cannot conveniently operate a terminal, thereby improving intelligence of human computer interaction and improving user experience.

BRIEF DESCRIPTION OF DRAWINGS

FIG. 4 is schematic structural diagram 1 of a terminal according to an embodiment of the present invention;

FIG. 5 is schematic flowchart 1 of a call control method according to an embodiment of the present invention;

DESCRIPTION OF EMBODIMENTS

The terms "first" and "second" in the following are merely intended for a purpose of description, and shall not be understood as an indication or implication of relative importance or implicit indication of a quantity of indicated technical features. Therefore, a feature restricted by "first" or "second" may explicitly indicate or implicitly include one or more such features. In the descriptions in the embodiments of the present invention, unless otherwise provided, "a plurality of" means two or more than two.

Figure 1:
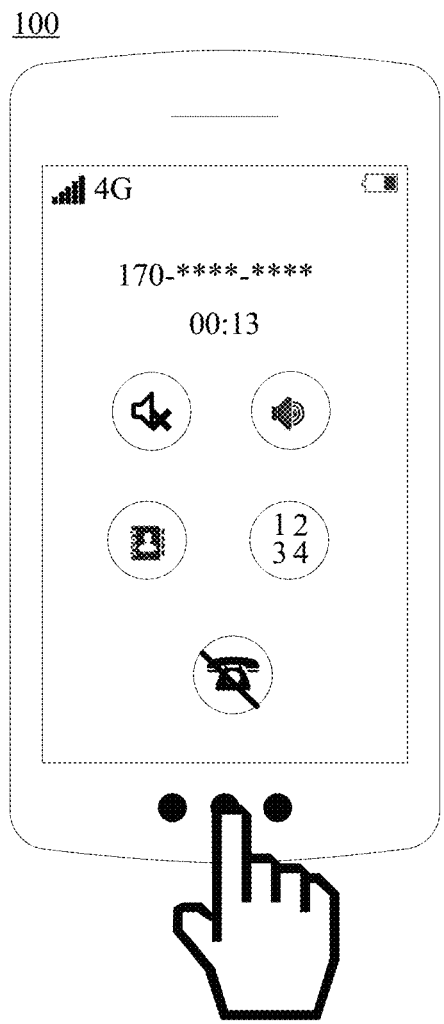
FIG. 1 is schematic diagram 1 of a scenario in which a multitasking scenario is entered in the prior art.
Figure 2:
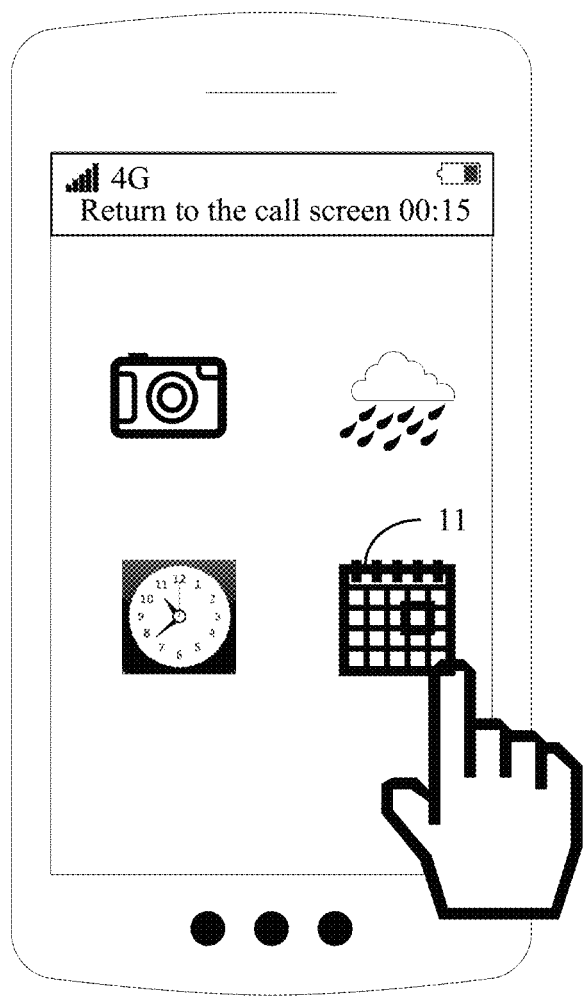
FIG. 2 is schematic diagram 2 of a scenario in which a multitasking scenario is entered in the prior art.

Currently, as shown in FIG. 1, when a user uses a terminal to perform a call function, an interface currently displayed by the terminal is generally an interface 100 of a call application. If the user wants to synchronously trigger another operation on the terminal while maintaining a call, the user generally needs to exit a call screen and enter another operation interface. For example, as shown in FIG. 2, the user may trigger another application on a main operation interface of the terminal, for example, trigger a calendar application 11 to enter an interface of the calendar application 11.

In this process, an interface operation can easily distract the user's attention, so that the user may miss some important information that the other party said during the call, thereby reducing user experience.

Figure 3:
FIG. 3 is schematic diagram 1 of an application scenario of a call control method according to an embodiment of the present invention.

For this, an embodiment of the present invention provides a call control method, which may be applied to a call scenario shown in FIG. 3. When a user uses a terminal to perform a call function, based on content of a call between a receiving party and a calling party (or referred to as a calling party and a called party), the terminal automatically generates an operation instruction corresponding to the call content, for example, a recording instruction or a mute instruction. In this way, the terminal may automatically execute the operation instruction, and the user can automatically execute the foregoing instruction without performing an extra interface operation during a call, thereby preventing the user from missing some call content when operating the terminal.

A call in all the embodiments of the present invention may be specifically a network-based network call, for example, a network call or a video call; or may be a common call. In addition, the call in all the embodiments of the present invention may be specifically a call between two parties, or may be a call among more than two parties, such as a conference call. This is not limited in the embodiments of the present invention.

Specifically, the terminal may create a database in advance, where the database stores correspondences between various target information and operation instructions. As shown in Table 1, when target information 1 is "Record", an operation instruction corresponding to the target information 1 is a recording operation instruction. That is, when the terminal obtains call content of "Record", the terminal may automatically determine and execute the recording operation instruction corresponding to the target information 1 based on a correspondence between the target information 1 and the recording operation instruction. Similarly, when the terminal obtains call content of "Cannot talk right now", the terminal may automatically determine and execute a mute operation instruction according to Table 1. When the terminal obtains call content of "Call you back later", the terminal may automatically determine and execute an alarm creation instruction according to Table 1.

TABLE 1

| Target information | Operation instruction |
| --- | --- |
| Record | Recording operation instruction |
| Cannot talk right now | Mute operation instruction |
| Call you back later | Alarm creation instruction |

In this way, the terminal may automatically generate and perform, based on the call content of the user, the operation instruction corresponding to the call content for the user, so that the user can automatically enter a multitasking scenario without performing an interface operation of a corresponding application.

It may be understood that the correspondence between the target information and the operation instruction in the foregoing database is merely used as an example. Using the foregoing recording operation instruction as an example, the target information corresponding to the recording operation instruction may include a plurality of forms of expression that are the same as or similar to the meaning of "Record". As shown in Table 2, when the target information is "Record", "Remember", "Write down", or the like, the corresponding operation instruction is the recording operation instruction.

TABLE 2

| Target information | Operation instruction |
|---|---|
| Record<br>Remember<br>Write down<br>... | Recording operation instruction |

In addition, the terminal may update the correspondence between the target information and the operation instruction in the foregoing database based on a usage habit and a language habit of the user. For example, the terminal may detect that the user opens an application 1 after the user said "Want to buy" during latest three calls, and the terminal may create a correspondence between target information "Want to buy" and an operation instruction "Open application 1" in the foregoing database. In this way, if terminal obtains call content of the "Want to buy" during a call next time, the terminal may automatically determine and execute, based on the foregoing correspondence, the operation instruction of opening the application 1. In addition, the user can manually perform an operation on the foregoing database, such as editing, adding, and deleting, to provide supplement to, correct, and customize the database.

Certainly, the terminal may also perform semantic analysis on a specific call content to obtain a result of the semantic analysis. If the result of the semantic analysis is also used to indicate the target information of "Record", the terminal may also determine that the operation instruction corresponding to the target information of "Record" is the recording operation instruction.

It should be noted that the foregoing merely lists an example scenario in which target information matches an operation instruction. It may be understood that a person skilled in the art may set, based on actual experience or an actual application scenario, a specific form of matching the target information with an operation instruction. This is not limited in this embodiment of the present invention.

The foregoing terminal may be specifically a mobile phone, a wearable device, an AR (augmented reality)/VR (virtual reality) device, a tablet computer, a notebook computer, a UMPC (ultra-mobile personal computer), a netbook, a PDA (personal digital assistant), or the like. This is not limited in this embodiment of the present invention.

The following describes each component of a terminal in detail with reference to FIG. 4.

An RF circuit 320 may be configured to: receive and send information, or receive and send a signal during a call. In particular, after receiving downlink information of a network access device, the RF circuit sends the downlink information to a processor 380 for processing; in addition, the RF circuit sends uplink data to the network access device. Generally, the RF circuit includes but is not limited to an antenna, at least one amplifier, a transceiver, a coupler, a low noise amplifier (LNA), a duplexer, or the like. In addition, the RF circuit 320 may communicate with a network and another device by using radio communications.

A memory 330 may be configured to store a software program and a module. The processor 380 runs the software program and the module that are stored in the memory 330, so as to perform various function applications of the terminal and data processing.

An input unit 340 may be configured to: receive input digital or character information, and generate key signal inputs related to user configuration and function control of the terminal. Specifically, the input unit 340 may include a touch panel 341 and another input device 342.

A display unit 350 may be configured to display information entered by a user or information provided for the user, and various menus of the terminal. The display unit 350 may include a display panel 351. Optionally, the display panel 351 may be configured in a form such as a liquid crystal display (LCD) or an organic light-emitting diode (OLED).

A camera 360 may also be used as an input device, specifically configured to convert a collected analog video or image signal into a digital signal, and then store the digital signal in the memory 330. Specifically, the camera 360 may include a front-facing camera, a rear-facing camera, a built-in camera, an external camera, and the like. This is not limited in this embodiment of the present invention.

The terminal may further include a gravity sensor and another sensor, for example, an optical sensor, a gyroscope, a barometer, a hygrometer, a thermometer, and an infrared sensor. Details are not described herein.

An audio frequency circuit 370, a loudspeaker 371, and a microphone 372 may provide an audio interface between the user and the terminal. The audio frequency circuit 370 may transmit, to the loudspeaker 371, an electrical signal that is obtained by converting received audio data, and the loudspeaker 371 converts the electrical signal to a sound signal for output. In addition, the microphone 372 converts a collected sound signal to an electrical signal. After receiving the electrical signal, the audio frequency circuit 370 converts the electrical signal to audio data, and then outputs the audio data to the RF circuit 320 for sending to, for example, another terminal, or outputs the audio data to the memory 330 for further processing.

As a control center of the terminal, the processor 380 connects all parts of the entire terminal by using various interfaces and cables. The processor 380, by running or executing the software program and/or the module stored in the memory 330 and by invoking data stored in the memory 330, performs various functions of the terminal and processes data, so as to perform overall monitoring on the terminal. Optionally, the processor 380 may include one or more processing units.

Although not shown, the foregoing terminal may further include a power source, a Wi-Fi (Wireless Fidelity) module, a Bluetooth module, and the like. Details are not described herein.

The following describes in detail a call control method according to an embodiment of the present invention with reference to specific embodiments. As shown in FIG. 5, the method includes the following steps:

501. A first terminal detects first call content during a call with a second terminal.

Figure 6:
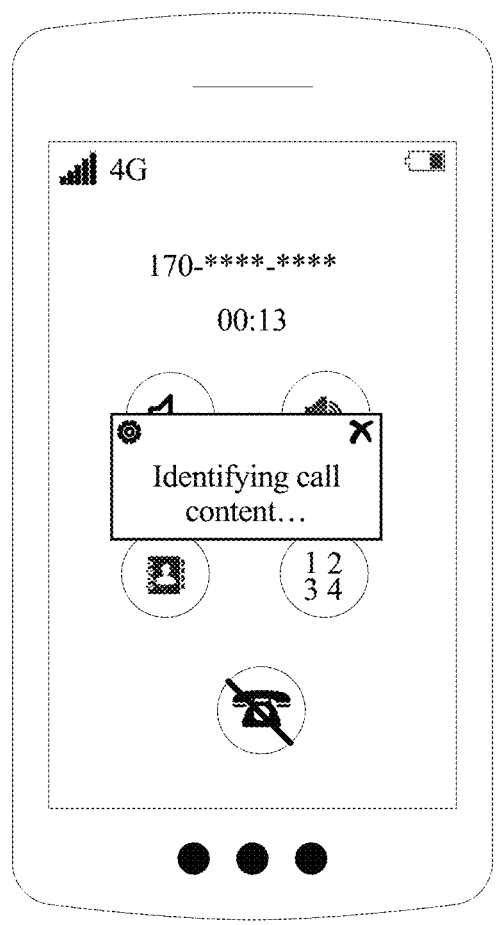
FIG. 6 is schematic diagram 2 of an application scenario of a call control method according to an embodiment of the present invention.

As shown in FIG. 6, when a user uses the first terminal to make the call with the second terminal, the first terminal may obtain and identify current call content in real time. For example, using two seconds as one period, the terminal may obtain the first call content that is "I am looking for a pen to write it down" in latest two seconds.

502. When the first call content includes preset target information, the first terminal obtains a recording operation instruction corresponding to the target information.

In step 502, the terminal may compare a voice of the foregoing first call content with all target voice information in the foregoing database. When the voice "wǒ zhǎo zhī bǐ jì yī xià" of the foregoing first call content "I am looking for a pen to write it down" includes preset target voice information "jì yī xià" (write down), the terminal may obtain, based on a correspondence between target information and an operation instruction shown in Table 2, an operation instruction corresponding to the target information "write down", and the operation instruction is a recording operation instruction.

503. In a state in which the first terminal maintains the call with the second terminal, the first terminal performs a recording operation on second call content that includes the first call content based on the recording operation instruction.

In step 503, in the state in which the first terminal maintains the call with the second terminal, the first terminal may directly execute the recording operation instruction obtained in step 502, and record call content of two minutes before and after the first call content "I am looking for a pen to write it down" for storing.

Specifically, the first terminal may first determine a target time for obtaining the foregoing first call content "I am looking for a pen to write it down", for example, 14:31:20, and then the first terminal may store, in the terminal, call content (that is, the second call content) of two minutes before and after the target time (that is, 14:29:20-14:33:20), to complete the foregoing recording operation instruction.

For example, the first terminal may record the call content at the start of the call, and after the target time of the foregoing first call content is obtained, calculate a target time period of the call content that needs to be reserved based on the target time, and then reserve the call content of the target time period, that is, obtain the second call content.

Alternatively, the first terminal may always buffer call content of a recent specific time period during the call, for example, call content of latest two minutes. Then, after obtaining the target time of the foregoing first call content, the first terminal starts to record call content of subsequent two minutes. In this way, the first terminal may use the buffered call content of the latest two minutes and the call content of two minutes that is subsequently recorded as the foregoing second call content.

Figure 7:
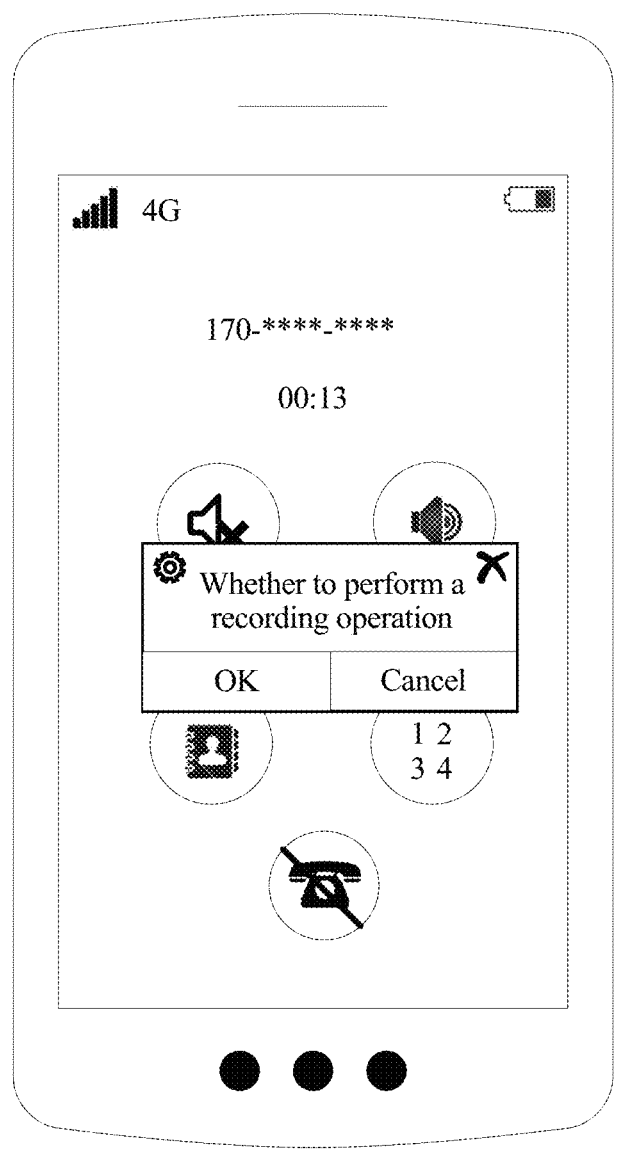
FIG. 7 is schematic diagram 3 of an application scenario of a call control method according to an embodiment of the present invention.

In addition, before the first terminal executes the foregoing recording operation instruction, as shown in FIG. 7, the first terminal may further ask the user, by using a display interface, whether to perform the recording operation. If the user determines to perform the recording operation, the first terminal is triggered to perform the foregoing step 503.

Figure 8:
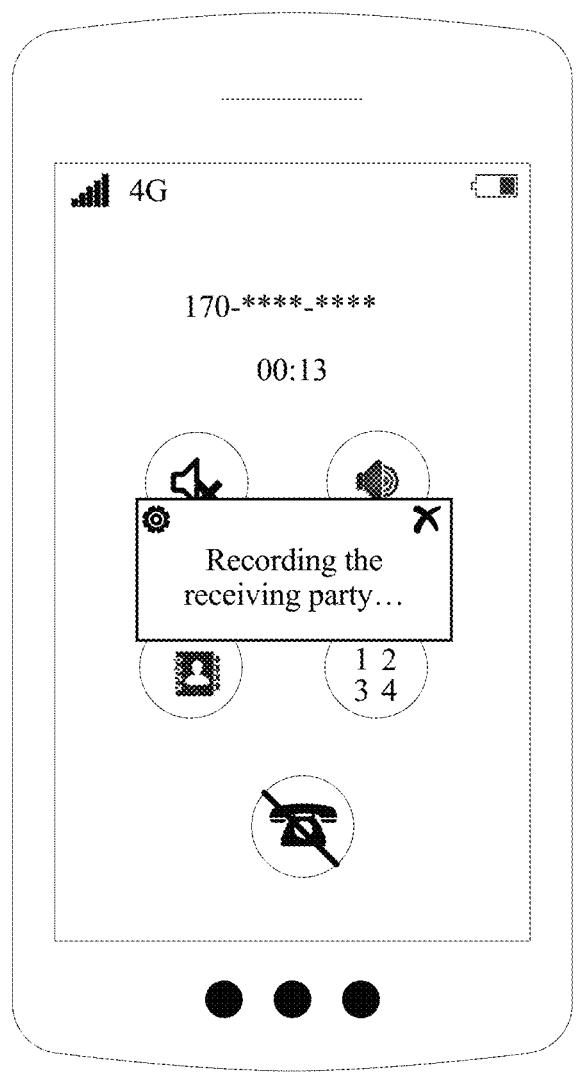
FIG. 8 is schematic diagram 4 of an application scenario of a call control method according to an embodiment of the present invention.
Figure 9:
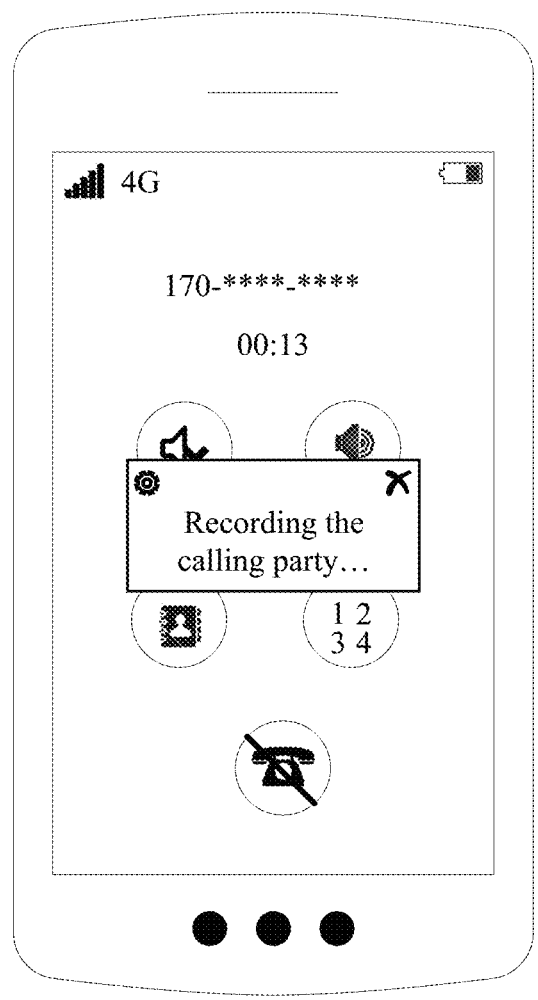
FIG. 9 is schematic diagram 5 of an application scenario of a call control method according to an embodiment of the present invention.

Further, when the recording operation instruction is executed, the user may specify whether only call content of a receiving party or call content of a calling party needs to be recorded. In this case, as shown in FIG. 8, the first terminal may instruct the user, by using a display interface, to record the call content of the receiving party; or as shown in FIG. 9, the first terminal may instruct the user, by using a display interface, to record the call content of the calling party.

Alternatively, the first terminal may instruct, by using a voice or a sound, the user to start or end recording. During the recording, the user may input an end recording instruction, for example, performing on-hook or operating a recording button.

In addition, when the terminal determines that the first call content includes the target information, the first terminal may further determine whether the first call content is said by a user that uses the first terminal or a user that uses the second terminal.

For example, when the foregoing first call content is "I am looking for a pen to write it down", and then the first terminal may determine, by using semantic analysis, that an operator of the first call content "write down" is "I", and the first call content is a voice sent through a voice sending channel in the first terminal to the second terminal. Therefore, the first terminal may determine that the first call content is said by the user that uses the first terminal.

Certainly, according to different voice characteristic parameters (such as sound intensity, pitch, or tone) of the receiving party and the calling party, the first terminal may determine whether the first call content is said by the user that uses the first terminal or the user that uses the second terminal. This is not limited in this embodiment of the present invention.

Then, when the first call content is used by the user that uses the first terminal, the first terminal may be triggered to perform the foregoing step 503, that is, execute the foregoing recording operation instruction. That is, when the first terminal determines that an operator that needs to be recorded is the user that uses the first terminal, the foregoing recording operation instruction may be executed. In this way, the first terminal may determine different roles during the call, and then execute the foregoing recording operation instruction, based on relationships between different roles and the first call content, on the party that has a recording demand.

Subsequently, after the call between the first terminal and the second terminal ends, the first terminal may store an obtained recording in a memory of the first terminal. In addition, the first terminal may add the obtained recording to an application such as call recording or voice memo, so that the user can subsequently query the recording. In this case, as shown in (a) in FIG. 10, the first terminal may indicate the user, by using a display interface, that the obtained recording is added to the call recording.

Figure 10:
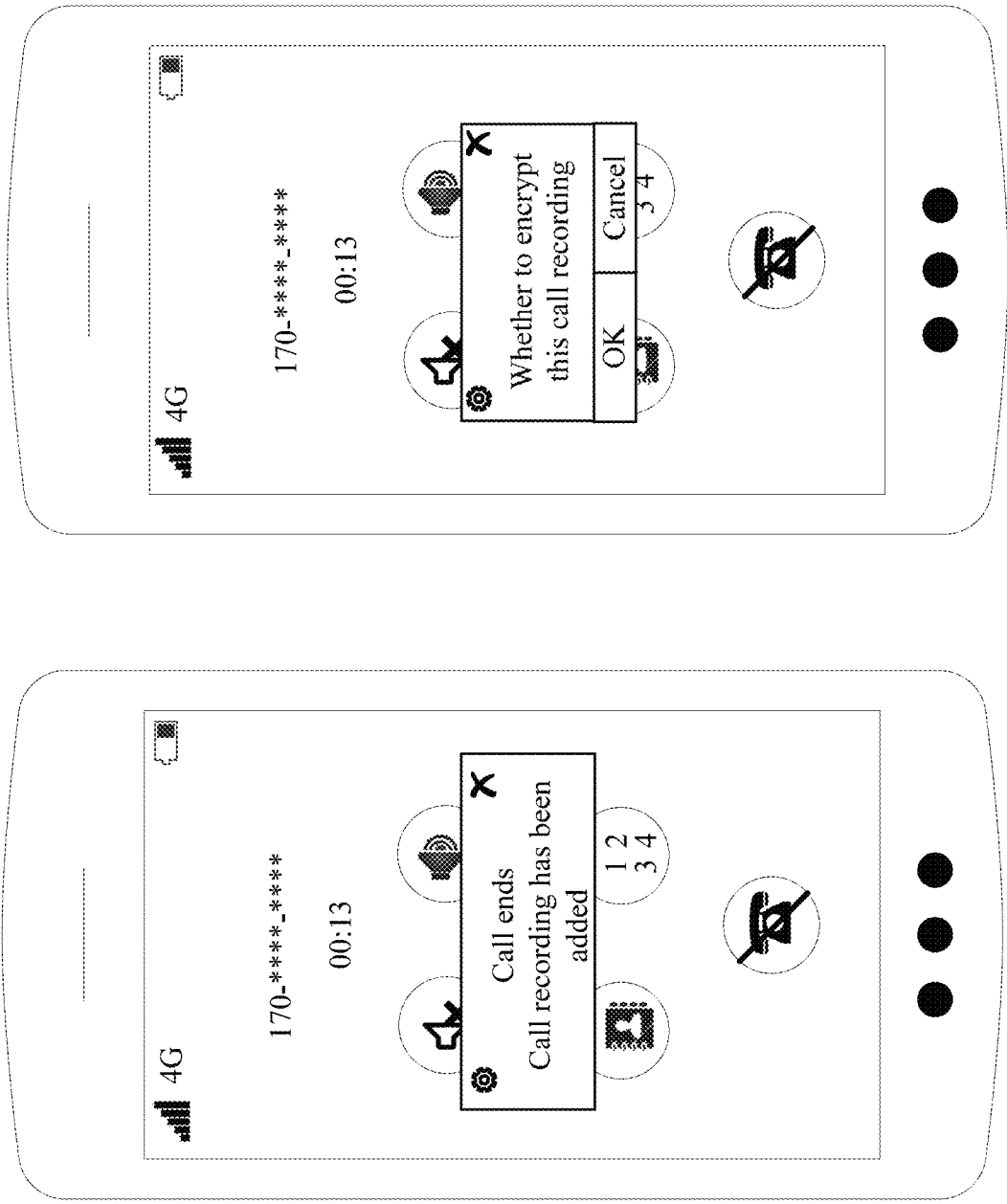
FIG. 10 is schematic diagram 6 of an application scenario of a call control method according to an embodiment of the present invention.

Further, after the first terminal stores the foregoing call recording, as shown in (b) in FIG. 10, the first terminal may ask the user, by using a display interface, whether to encrypt the foregoing call recording. After the user determines to encrypt the foregoing call recording, the first terminal may further encrypt the foregoing call recording, for example, allocate a key to the call recording; or the user set a key for the call recording; or the call recording is stored in private storage space. This is not limited in this embodiment of the present invention. In this way, privacy disclosure of a user during a call may be avoided by performing encryption.

Certainly, the first terminal may also perform an encryption operation on each stored call recording by default. Alternatively, the first terminal may provide encryption selection on a setting interface shown in FIG. 21, by default or when the user selects to perform encryption, all the stored call recordings are encrypted. This is not limited in this embodiment of the present invention.

In addition, the first terminal may perform speech recognition on the foregoing call recording, for example, convert voice information in the foregoing call recording into text information, and display the text information to the user. For another example, the first terminal may further extract, by performing the speech recognition, one or more of information such as a time, a place, a character, and a location that are used in the foregoing call recording; automatically display the extracted time, place, character, or location for the user; and associate, automatically or after the user performs confirmation, the information with each other or with a schedule or a memo, so as to generate a schedule or a reminder. This is not limited in this embodiment of the present invention.

Therefore, by applying this embodiment of the present invention, the terminal may identify a recording demand of a user during a call, and implement automatic recording, so that operation complexity of a user can be reduced, and intelligence of human computer interaction is provided.

Figure 11:
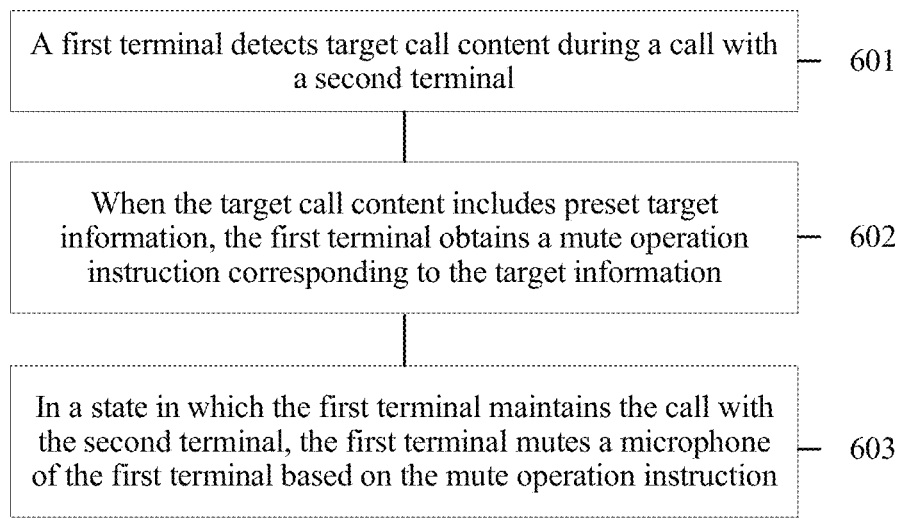
FIG. 11 is schematic flowchart 2 of a call control method according to an embodiment of the present invention.

An embodiment of the present invention further provides a call control method. As shown in FIG. 11, the method includes:

601. A first terminal detects target call content during a call with a second terminal.

Similar to step 501, when a user uses the first terminal to make the call with the second terminal, the first terminal may obtain and identify current call content in real time. For example, two seconds are used as one period, and the terminal may obtain call content (that is, the target call content) in latest two seconds, for example, the target call content is "I cannot talk right now".

602. When the target call content includes preset target information, the first terminal obtains a mute operation instruction corresponding to the target information.

The terminal may compare the foregoing target call content with all target information in the foregoing database. As shown in Table 1, when the foregoing target call content "I cannot talk right now" matches the preset target information "Cannot talk right now", the terminal may obtain, based on a correspondence between target information and operation instructions, an operation instruction corresponding to the target information "Cannot talk right now", and the operation instruction is a mute operation instruction.

Certainly, the target information corresponding to the mute operation instruction may alternatively include "Please mute", "Do not speak", "In a meeting", and the like. This is not limited in this embodiment of the present invention.

603. In a state in which the first terminal maintains the call with the second terminal, the first terminal mutes a microphone of the first terminal based on the mute operation instruction.

In the state in which the first terminal maintains the call with the second terminal, the first terminal may directly execute the mute operation instruction obtained in step 602, to mute the microphone of the first terminal.

For example, a user A that uses the first terminal makes a call with a user B that uses the second terminal. When the user A says "I am in a meeting, and cannot talk right now" (which matches a voice of the preset target information "Cannot talk right now") to the user B, the first terminal obtains the operation instruction corresponding to the target information "Cannot talk right now", and the operation instruction is the mute operation instruction. Then, the first terminal may mute the microphone of the first terminal, that is, execute the mute operation instruction.

For another example, when a user A, a user B, and a user C make a conference call by using their respective terminals, the user C says, "There is much noise from user A, please mute". An operation instruction corresponding to "Pleas mute" is the mute operation instruction, and after a terminal of the user A detects that the received call content matches the preset target information, an operator of "Please mute" may be determined as the user A by using semantic analysis or by analyzing a quantity of voice sending information in a current voice sending channel, and then the terminal of the user A may mute a microphone of the terminal of the user A, that is, execute the mute operation instruction.

For another example, when a user A, a user B, and a user C make a conference call by using their respective terminals, the user C finds that a sound sent by a terminal used by the user A is noisy, and says "There is much noise from user A, please mute". Then, a terminal used by the user C may also determine an object of "Please mute" is the user A by using semantic analysis or by analyzing a quantity of voice receiving information of a current voice receiving channel, so as to perform a mute operation on the terminal A.

Figure 12:
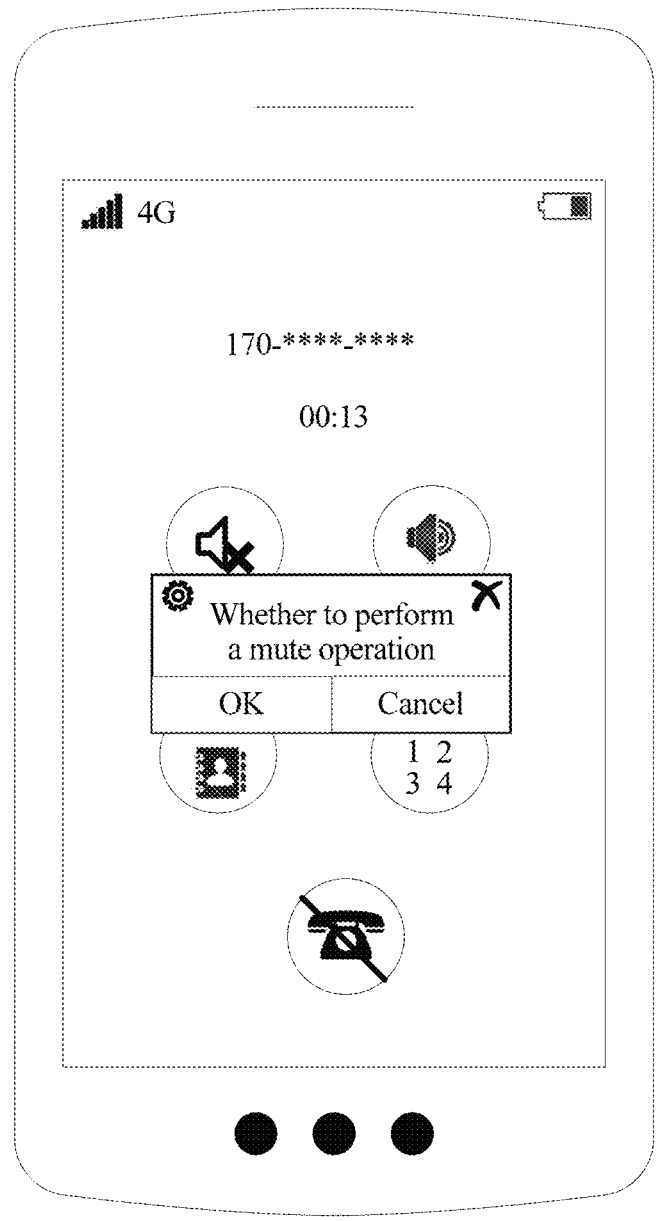
FIG. 12 is schematic diagram 7 of an application scenario of a call control method according to an embodiment of the present invention.
Figure 13:
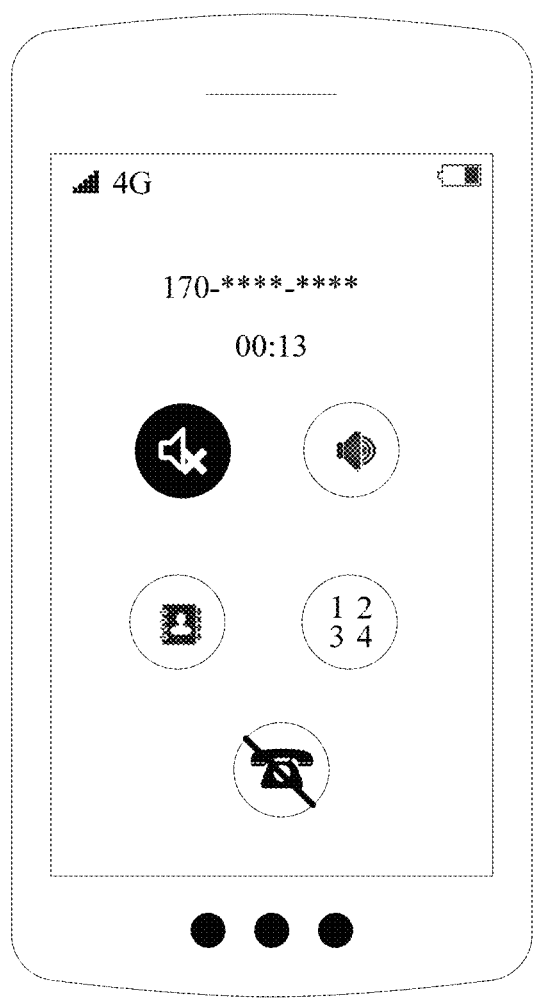
FIG. 13 is schematic diagram 8 of an application scenario of a call control method according to an embodiment of the present invention.

In addition, before the first terminal executes the foregoing mute operation instruction, as shown in FIG. 12, the first terminal may ask the user, by using a display interface, whether to perform the mute operation; and if the user determines to perform the mute operation, the first terminal is triggered to perform the foregoing step 603. In this case, as shown in FIG. 13, a call screen of the first terminal may indicate the user that the mute operation is performed.

Therefore, an embodiment of the present invention provides a call control method, so that a terminal (one or more parties) can detect call content during a call, and automatically performs the mute operation on a corresponding calling party when detecting that the call content matches preset information. The mute operation is performed automatically, and a user does not need to look for a mute button. This is convenient for the user, increases operation efficiency of the user, and enables the user to focus on a current call without diverting attention to perform another operation, thereby improving intelligence of human computer interaction. In particular, during a multiparty call, when one calling party does not speak but there is much ambient noise and consequently affects multiparty call quality without being noticed by the calling party, a remote and automatic mute operation can be performed by another calling party on the calling party, or the mute operation can be automatically performed by a terminal of the calling party on the terminal of the calling party based on speech content of another calling party, thereby simplifying user operation and improving call quality.

Figure 14:
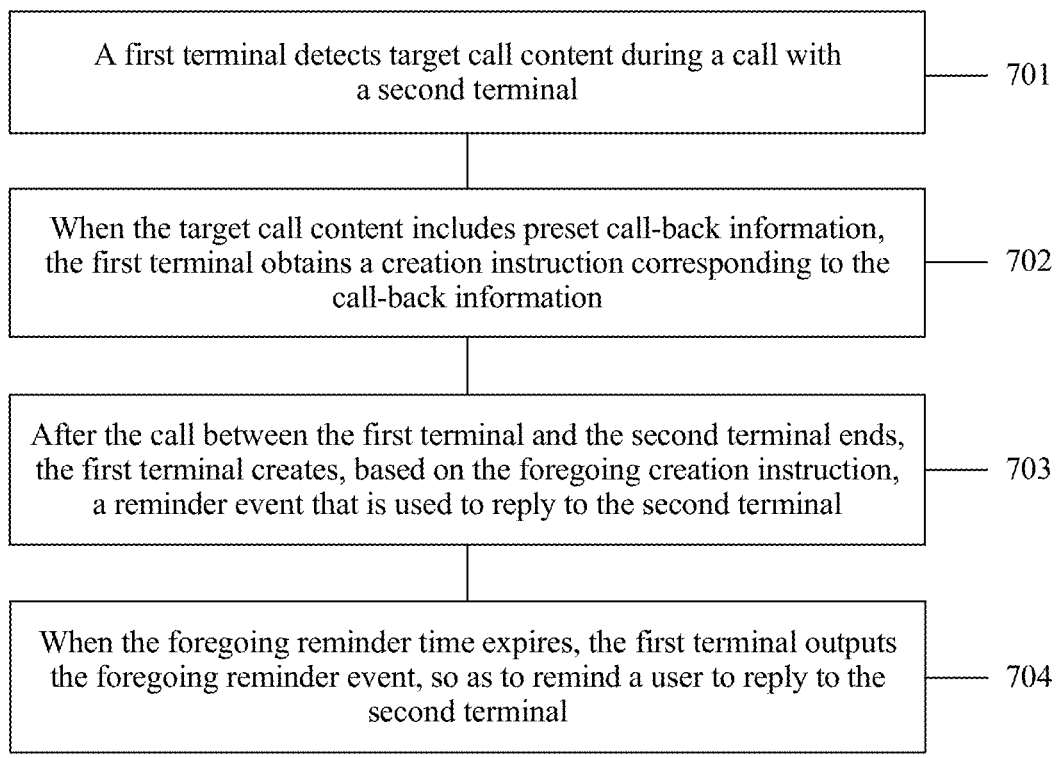
FIG. 14 is schematic flowchart 3 of a call control method according to an embodiment of the present invention.

An embodiment of the present invention further provides a call control method. As shown in FIG. 14, the method includes:

701. A first terminal detects target call content during a call with a second terminal.

Similar to step 501 and 601, when a user uses the first terminal to make the call with the second terminal, the first terminal may obtain and identify current call content in real time. For example, two seconds are used as one period, and the terminal may obtain call content (that is, the target call content) in latest two seconds, for example, the target call content is "I will call you back later" said by a user that uses the first terminal to the user that uses the second terminal.

702. When the target call content includes preset call-back information, the first terminal obtains a creation instruction corresponding to the call-back information, where the creation instruction is used as an instruction of creating a reminder event that replies to the first terminal or the second terminal after the call ends.

The foregoing call-back information may be specifically a word or a sentence such as "Call you back later", "Call you back in a moment", and "Call you back soon" that indicates a promise to reply to a call. The call-back information may be stored in the foregoing database. This is not limited in this embodiment of the present invention.

In step 702, the terminal may compare the foregoing target call content with all call-back information in the foregoing database. When the foregoing target call content "Call you back later" includes the preset call-back information "Call you back later", the terminal may obtain, based on a correspondence between call-back information and operation instructions, an operation instruction corresponding to the call-back information "I will call you back later", and the operation instruction is the creation instruction.

The creation instruction is used as an instruction of creating a reminder event that is used to reply to the first terminal or the second terminal after the call ends. For example, the reminder event may be an alarm, a memo event, a calendar event, or situational intelligence.

The situational intelligence can automatically collect a short message, an email, a weather forecast, a calendar, a contact, and the like that you receive, and automatically arrange a schedule for you. For example, when a short message for booking a high-speed train ticket or an airplane ticket is received, a reminder is arranged, and information such as your train number and seat number is added to a pull-down notification bar. When repayment information of a bank is received, a reminder is created at a time of repayment. When a birthday or an anniversary of a contact arrives, a reminder is created to remind you to send a blessing. When weather changes, at least one of reminder cards such as putting on more clothes or bringing an umbrella is displayed.

703. After the call between the first terminal and the second terminal ends, the first terminal creates, based on the foregoing creation instruction, a reminder event that is used to reply to the second terminal, where the reminder event includes a reminder time preset by a terminal.

704. When the foregoing reminder time expires, the first terminal outputs the foregoing reminder event, so as to remind a user to reply to the second terminal.

Specifically, when the call between the first terminal and the second terminal ends, the first terminal may first determine a time at which the call with the second terminal ends, that is, a call end time. Further, the first terminal may determine a time later than the end call moment as a reminder time of the foregoing reminder event. For example, a time of 10 minutes after the call end time is determined as the reminder time, in this way, the first terminal may create the reminder event for the user based on the reminder time.

That is, the reminder time in the foregoing reminder event is obtained through calculation by the first terminal based on the call end time at which the call ends, and is not obtained based on the content of the call between the first terminal and the second terminal. In this way, only the foregoing call-back information needs to be detected in the call content, so that the first terminal can be triggered to automatically create a reminder event that includes the reminder time, and the user does not need to specify parameters such as a time and a place of the reminder event in the call content, that is, the user does not need to consider creating the reminder event, and only needs to focus on a natural communication. The terminal may extract information from a natural communication language of the user, and determine whether the reminder event needs to be automatically created.

Certainly, the first terminal may also synchronously create a reminder event during the call with the second terminal, but a reminder time is not set in the reminder event. When the first terminal and the second terminal end the call, the first terminal determines the reminder time based on the call end time, and adds the reminder time to the created reminder event, thereby completing a process of creating the reminder event.

Figure 15:
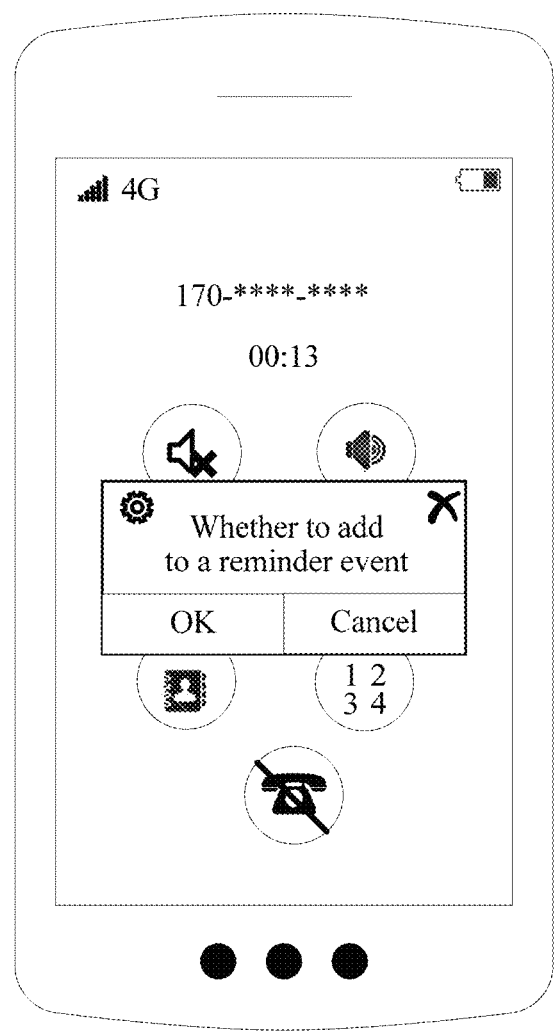
FIG. 15 is schematic diagram 9 of an application scenario of a call control method according to an embodiment of the present invention.
Figure 16:
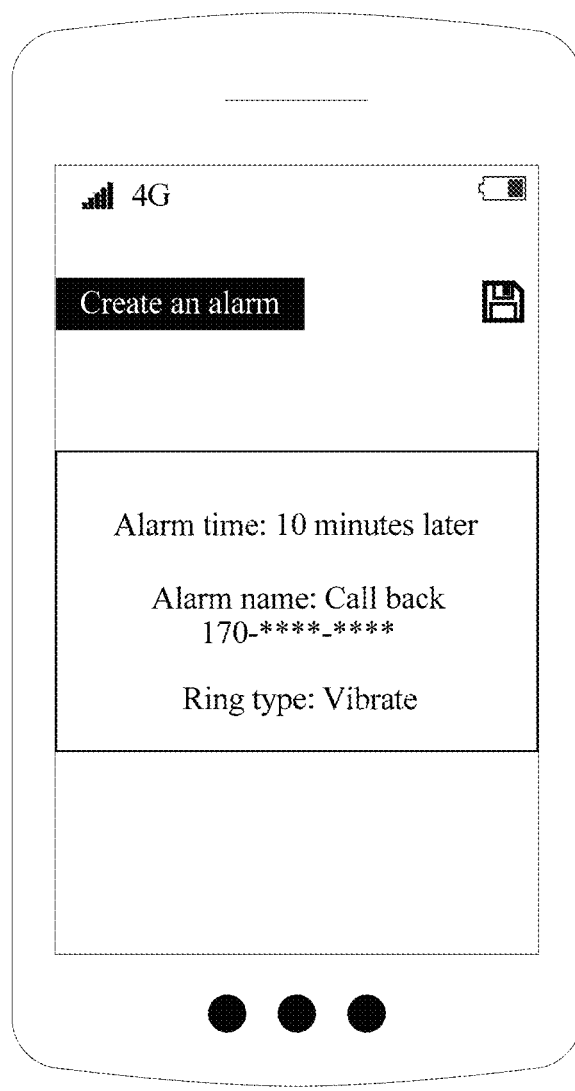
FIG. 16 is schematic diagram 10 of an application scenario of a call control method according to an embodiment of the present invention.

An alarm is used as an example of the foregoing reminder event. As shown in FIG. 15, when the first terminal and the second terminal end the call, the first terminal may ask, by using a display interface, the user whether to add a reminder event. If the user determines to add the reminder event, as shown in FIG. 16, the first terminal may automatically enter an application interface of the alarm, and create an alarm whose alarm time is 10 minutes later.

In addition, the first terminal may set a name (or a label) of the alarm as "Call back 170-**-", where 170-- is a phone number of the second terminal obtained by the first terminal. This is the prior art, and details are not described herein. Certainly, if 170--** is a contact A that is already stored in the first terminal, the first terminal may directly instruct the user to "Call back the contact A".

Similarly, the foregoing reminder event may alternatively be a memo event, for example, a memo. In this case, as shown in FIG. 17, the first terminal may create a memo, and record "Call back 170-**-**" in the memo.

Figure 17:
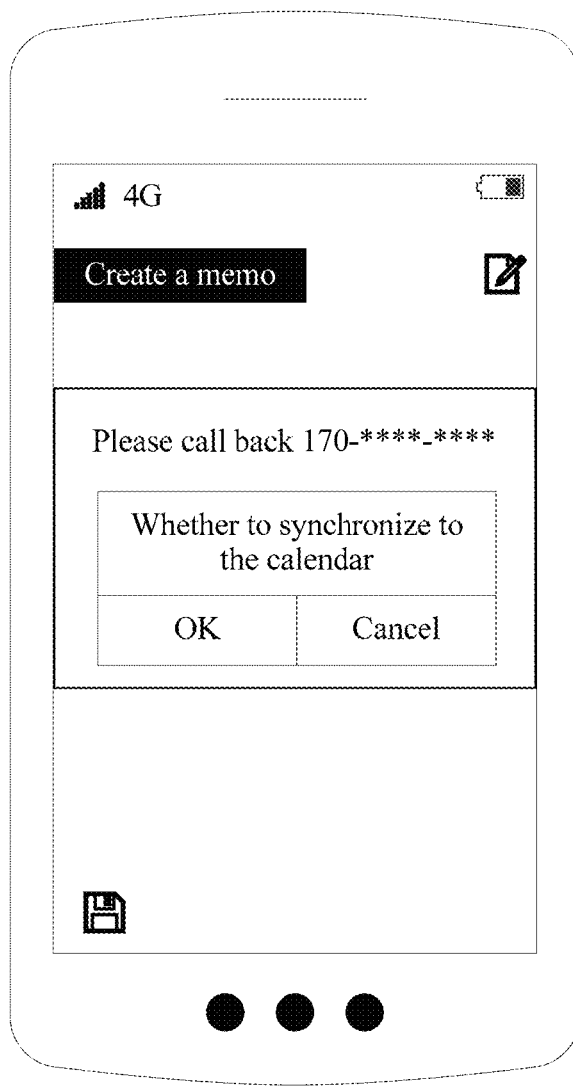
FIG. 17 is schematic diagram 11 of an application scenario of a call control method according to an embodiment of the present invention.
Figure 18:
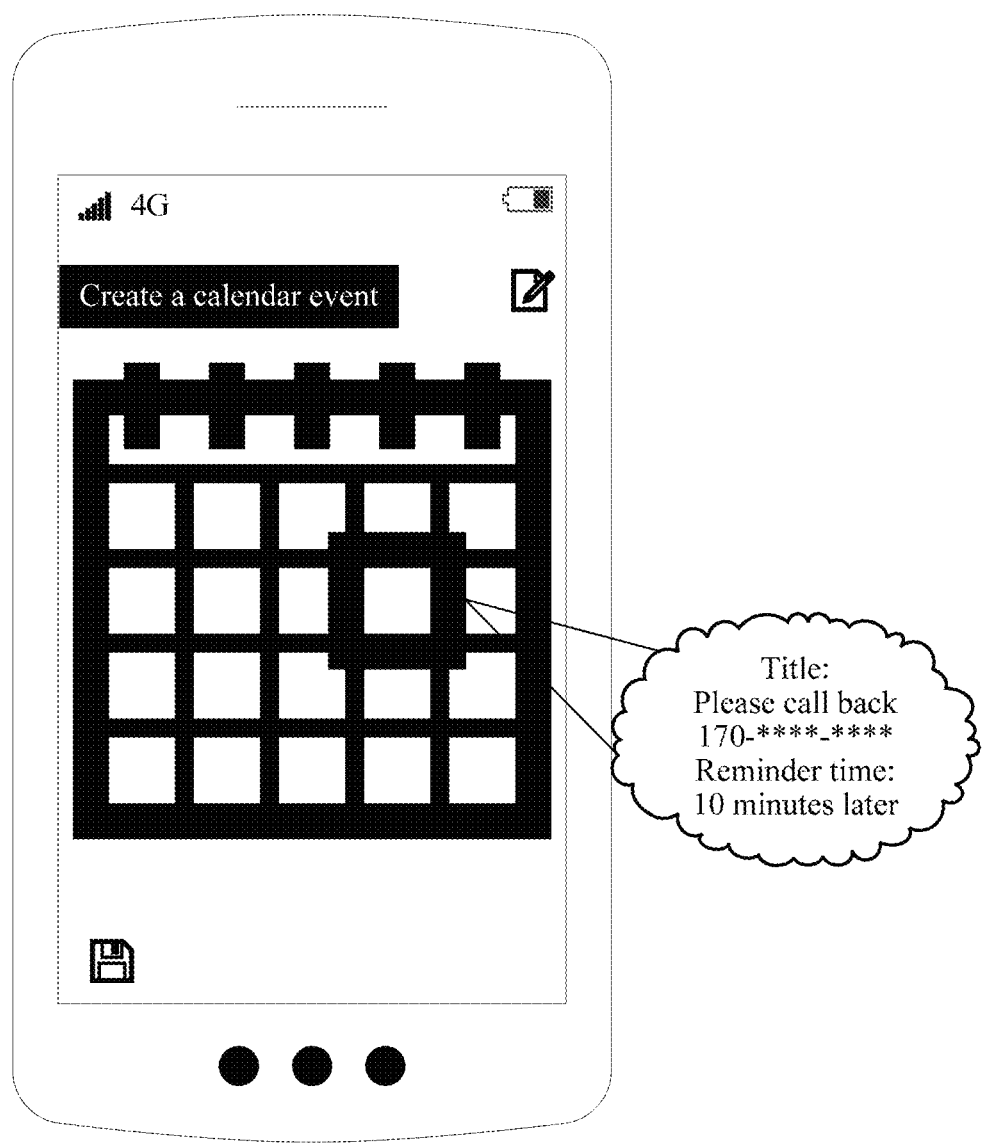
FIG. 18 is schematic diagram 12 of an application scenario of a call control method according to an embodiment of the present invention.

In addition, as shown in FIG. 17, after the user determines that the memo is synchronized to the calendar, the first terminal may synchronize the memo to a day on which the foregoing call occurs in the calendar, that is, create a calendar event. A title of the calendar event is: Please call back 170-**-**, and a reminder time of the calendar event is 10 minutes after the call ends.

Certainly, the user may also set the foregoing reminder event, for example, the alarm, the memo event, and the reminder time and a reminder manner in the calendar event. This is not limited in this embodiment of the present invention.

Figure 19:
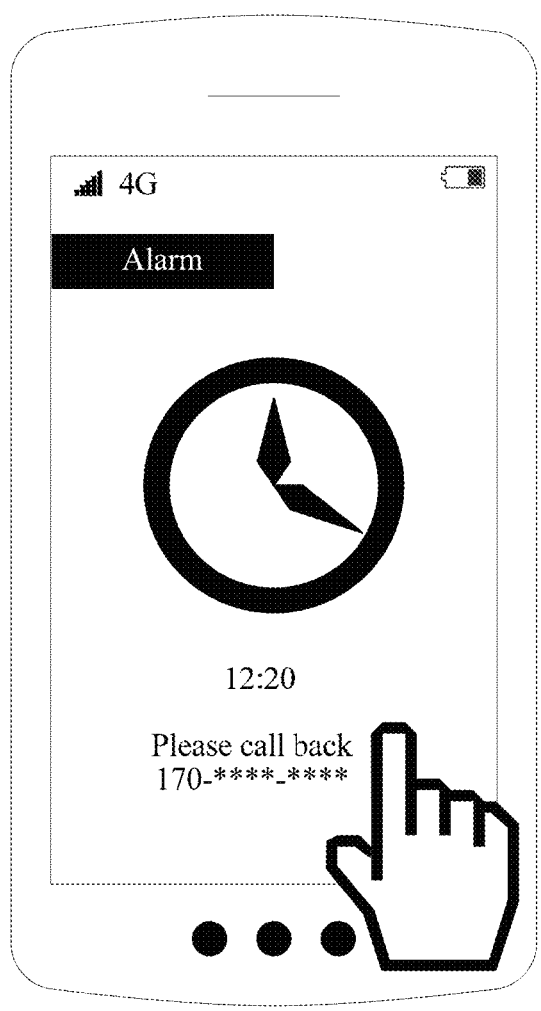
FIG. 19 is schematic diagram 13 of an application scenario of a call control method according to an embodiment of the present invention.

In this way, when the foregoing reminder time expires, for example, as shown in FIG. 19, when the alarm time set for the foregoing alarm expires, the alarm starts to ring, so as to remind the user to reply a call or a message to the second terminal.

Figure 20:
FIG. 20 is schematic diagram 14 of an application scenario of a call control method according to an embodiment of the present invention.

In this case, when the user taps a phone number or a contact of the second terminal, as shown in FIG. 20, the terminal may directly jump to a call screen used for calling the second terminal or jump to a message editing interface used for sending the message to the second terminal.

In addition, the foregoing target call content may alternatively be sent by the second terminal to the first terminal. For example, when talking to a user that uses the first terminal, a user that uses the second terminal said, "I will call you back later". In this case, when obtaining target call content that is the same as the call-back information "Call you back later" by the first terminal, the first terminal may also create a reminder event based on the corresponding creation instruction.

In different cases, when the reminder time set in the reminder event expires, the first terminal may send the reminder event to the second terminal, so as to remind the second terminal to reply a call or a short message to the first terminal in time. Certainly, a manner in which the first terminal sends the reminder event to the second terminal may be set by a person skilled in the art. This is not limited in this embodiment of the present invention.

Therefore, in this embodiment of the present invention, only whether information that matches the call-back information is in the call content needs to be detected, and information such as a time, a location, a reminder start time, and the like do not need to be detected or obtained from the call content, thereby reducing voice/semantic analysis complexity, saving system resources, and improving a processing speed of a system.

Figure 21:
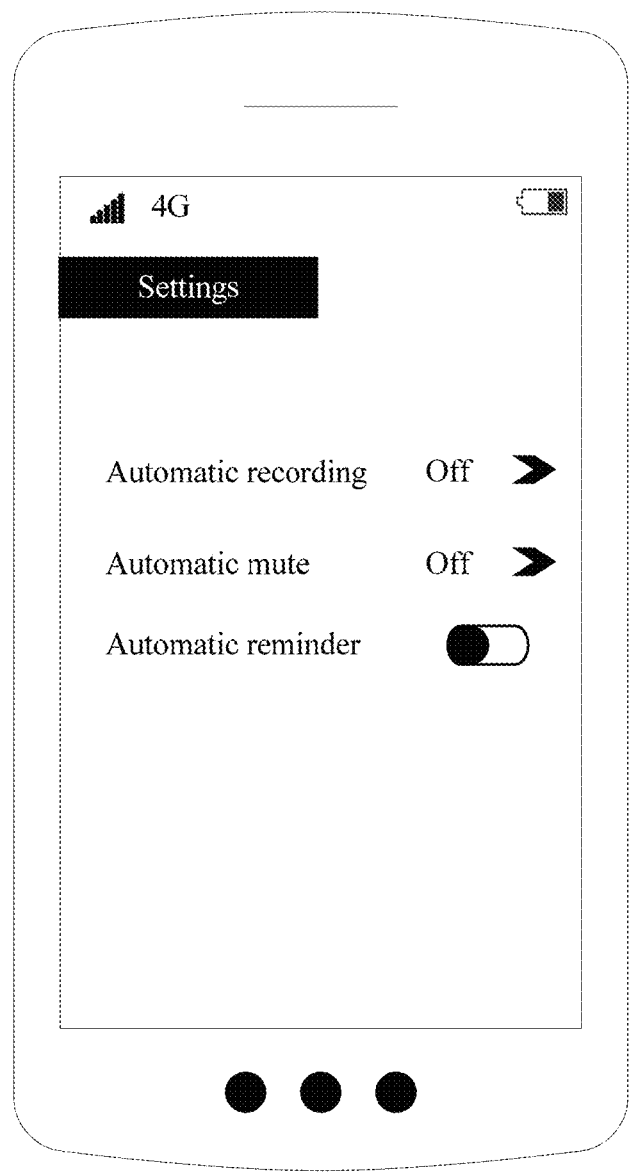
FIG. 21 is schematic diagram 15 of an application scenario of a call control method according to an embodiment of the present invention.

Further, as shown in FIG. 21, an automatic recording function used in steps 501-503, an automatic mute function used in steps 601-603, and function keys of an automatic reminding function used in steps 701-704 may be set in the first terminal, and the user may determine whether to start the automatic recording function, the automatic mute function, and the automatic reminding function by using these function keys.

Certainly, steps 501-503, 601-603, and 701-704 in the foregoing embodiment are merely used as examples, and a person skilled in the art may further set the foregoing database and an implementation based on actual experience and an actual application scenario.

In addition, a technical means for determining whether the call content matches preset target information may be mutually referenced, for example, may be analysis on a sound itself, such as performing matching between a sound, a tone, a duration, or the like and the preset target information; or may be performing a semantic analysis on the sound, and performing matching between a result of the semantic analysis and the preset target information; or may be another technical means that can implement the function. This is not limited in the present invention.

For example, when the call content obtained by the terminal includes target information such as "sound is very low" and "Cannot be heard clearly", the terminal may further automatically obtain and execute a volume adjustment instruction. When the call content obtained by the terminal includes the target information of an expression time, a place, and a character, the terminal may automatically create a corresponding calendar event in the calendar based on the time, so as to remind the user to process related events used in the call content on time.

Implementation principles of the foregoing method embodiments are similar, and mutual reference may be made between the embodiments.

In addition, implementation of the foregoing method embodiments may be based on the fact that it is detected that a terminal is being held by a user, or the fact that it is detected that the terminal is in a specific held state, for example, the terminal is held by a user and placed near the ear. In this way, by determining that another operation cannot be conveniently performed by the user during a call, the specified function may be automatically performed when a specific condition is met, so as to provide an operation convenience for the user in an intelligent way.

It may be understood that, to implement the foregoing functions, the foregoing terminal includes corresponding hardware structures and/or software modules for performing the functions. A person skilled in the art should be easily aware that, the units and algorithm steps in the examples described with reference to the embodiments disclosed in the embodiments of the present invention may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the embodiments of the present invention.

In this embodiment of the present invention, functional modules of the terminal may be divided based on the foregoing method example. For example, each function module may be divided according to each function, or two or more functions may be integrated into one processing module. The integrated module may be implemented in a form of hardware, or may be implemented in a form of a functional module of software. It should be noted that the module division in the embodiments of the present invention is an example, and is merely logical function division. There may be another division manner in actual implementation.

Figure 22:
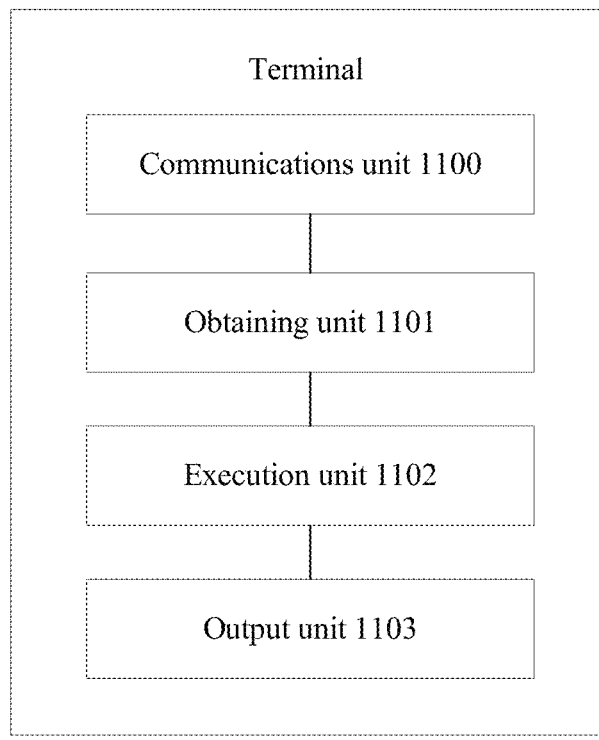
FIG. 22 is schematic structural diagram 2 of a terminal according to an embodiment of the present invention.

When each function module is divided based on a corresponding function, FIG. 22 is a possible schematic structural diagram of a terminal used in the foregoing embodiment. The terminal includes: a communications unit 1100, a detection unit 1101, an execution unit 1102, and an output unit 1103.

The communications unit 1100 is configured to establish a voice call, for example, a wireless call may be implemented by a baseband chip, and the communications unit performs communication with a base station of a mobile communications network, and performs modulation, demodulation, coding, and decoding on uplink and downlink radio signals. The detection unit 1101 is configured to support the terminal in performing processes 501 and 502 in FIG. 4, processes 601 and 602 in FIG. 11, and processes 701 and 702 in FIG. 14. The execution unit 1102 is configured to support the terminal in performing a process 503 in FIG. 5, a process 603 in FIG. 11, and a process 703 in FIG. 14. The output unit 1103 is configured to support the terminal in performing a process 704 in FIG. 14. All related content of steps used in the foregoing method embodiments may be cited in function descriptions of corresponding functional modules. Details are not described herein again.

Figure 23:
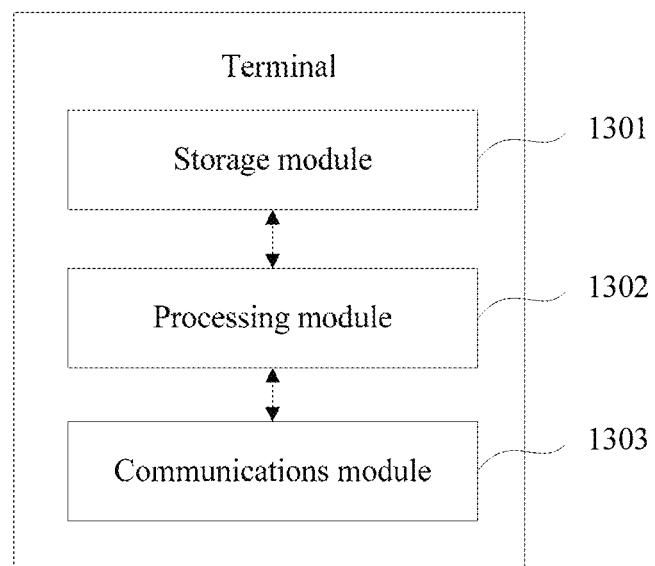
FIG. 23 is schematic structural diagram 3 of a terminal according to an embodiment of the present invention.

When an integrated unit is used, FIG. 23 is a possible schematic structural diagram of a terminal in the foregoing embodiments. The terminal includes: a processing module 1302 and a communications module 1303. The processing module 1302 is configured to control and manage the terminal. The communications module 1303 is configured to support communication between the terminal and another network entity. The terminal may further include a storage module 1301, configured to store program code and data of the terminal.

The processing module 1302 may be one or more processors or controllers, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 1302 may implement or execute various logical blocks that are used as examples, modules, and circuits that are described with reference to the content disclosed in the present invention. The processor may also be a combination of computing functions, for example, a combination of one or more microprocessors or a combination of a DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal in this embodiment of the present invention may be the terminal shown in FIG. 4.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computers instructions. When the computer program instructions are loaded and executed on the computer, the procedures or functions according to the embodiments of the present invention are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing terminal provided in this embodiment of the present invention may intelligently determine and initiate a preset function when a user does not explicitly input a command. Therefore, when the user cannot conveniently operate a specific function (for example, the user cannot make a hand to perform, or a touchscreen is not sensitive when there are oil and stain on hand), the user that is not familiar with the terminal function can also enjoy the specific function when the user has a need and does not need to pay learning costs, thereby providing convenience for the user, improving user experience, and increasing market competitiveness of a product.

The foregoing descriptions are merely specific embodiments of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. A terminal, comprising a communications unit, a detection unit, an execution unit, and an output unit, wherein
the communications unit is configured to: establish a call between the terminal and another terminal;
the detection unit is configured to: detect content of the call between the terminal and the other terminal during the call; and
the execution unit is configured to: in response to determining that the call content matches call-back information, automatically create a reminder event, wherein the reminder event comprises a preset reminder time preset by the terminal; and when it is detected that the call between the terminal and the other terminal ends, calculate the reminder time; and
the output unit is configured to: in response to determining that the reminder time expires, output the reminder event.

2. The terminal according to claim 1, wherein
the execution unit is configured to: determine a call end time at which the call with the other terminal ends; determine a reminder time that is later than the call end time; and create a reminder event based on the reminder time, wherein the reminder event comprises at least one of an alarm, a memo event, and a calendar event.

3. The terminal according to claim 1, wherein
the output unit is configured to: output the reminder event on the terminal to remind a user of the terminal to reply to the other terminal; or send the reminder event to the other terminal to remind a user of the other terminal to reply to the terminal.

4. The terminal according to claim 1, wherein
the execution unit is further configured to: in response to determining that the call content matches preset target information, automatically record at least a part of the call content for a preset period.

5. The terminal according to claim 4, wherein
the execution unit is configured to: automatically record call content of the other terminal; or automatically record call content of the terminal; or automatically record call content of the terminal and the other terminal.

6. A terminal, comprising one or more processors and one or more memories that are coupled to the one or more processors, wherein the one or more memories are configured to store computer program code, the computer program code comprises a computer instruction, and when the one or more processors execute the computer instruction, the terminal performs:
establishing a call between the terminal and another terminal;
detecting content of the call between the terminal and the other terminal during the call;
in response to determining that the call content matches call-back information, automatically creating a reminder event, wherein the reminder event comprises a preset reminder time preset by the terminal; and when it is detected that the call between the terminal and the other terminal ends, calculate the reminder time; and
in response to determining that the reminder time expires, outputting the reminder event on the output device.

7. The terminal according to claim 6, wherein the one or more processors are configured to determine a call end time at which the call with the other terminal ends; determine a reminder time that is later than the call end time; and create a reminder event based on the reminder time, wherein the reminder event comprises at least one of an alarm, a memo event, and a calendar event.

8. The terminal according to claim 6, wherein the one or more processors are configured to output the reminder event on the output device to remind a user of the terminal to reply to the other terminal; or send the reminder event to the other terminal to remind a user of the other terminal to reply to the terminal.

9. The terminal according to claim 8, wherein the outputting of the reminder event on the terminal to remind a user of the terminal to reply to the other terminal comprises:
outputting the reminder event on the terminal to remind a user of the terminal to reply to the other terminal; and
in response to receive an information indicating that a user taps a phone number or a contact of the other terminal, jumping to a call interface for calling or to a message editing interface for sending a message to the other terminal.

10. The terminal according to claim 6, wherein the automatically creating of a reminder event comprises:
displaying an interface on the output device to ask a user whether to add a reminder event; and
in response to receive an approval from a user, automatically entering an application interface of an alarm, a memo or a calendar, and create an alarm, a memo or a calendar correspondingly.

11. The terminal according to claim 6, wherein the call content is "Call you back later", "Call you back in a moment", or "Call you back soon".

12. A terminal, comprising one or more processors and one or more memories that are coupled to the one or more processors, wherein the one or more memories are configured to store computer program code, the computer program code comprises a computer instruction, and when the one or more processors execute the computer instruction, the terminal performs:
   establishing a call between the terminal and another terminal;
   detecting content of the call between the terminal and the other terminal; and
   in response to determining that the call content matches preset target information, automatically recording at least a part of the call content for a preset period.

13. The terminal according to claim 12, wherein the automatically recording of at least a part of the call content for a preset period comprises:
   recording the call content at the start of the call; and
   after the target time of the foregoing first call content is obtained, calculating a target time period of the call content that needs to be reserved based on the target time, and then reserve the call content of the target time period.

14. The terminal according to claim 12, wherein the automatically recording at least a part of the call content for a preset period comprises:
   displaying an interface to ask a user whether to perform the recording operation; and
   in response to receive an approval from a user, automatically recording at least a part of the call content for a preset period.

15. The terminal according to claim 12, wherein the call content is "I am looking for a pen to write it down".

16. The terminal according to claim 12, wherein after the automatically record at least a part of the call content for a preset period, the processor is further configured to:
   display an interface to ask a user whether to encrypt a call recording; and
   in response to receiving an approval from a user, automatically encrypt the call recording by allocating a key to the call recording or ask the user setting a key for the call recording.

* * * * *